United States Patent
Klemans et al.

(10) Patent No.: US 9,648,654 B2
(45) Date of Patent: May 9, 2017

(54) ACOUSTIC PAIRING

(71) Applicant: NXP B.V., Eindhoven (NL)

(72) Inventors: Niels Klemans, Eindhoven (NL); Casper van der Avoort, Eindhoven (NL); Kim Phan Le, Eindhoven (NL); Min Li, Leuven (NL); Christophe Marc Macours, Leuven (NL); Shawn William Scarlett, Nijmegen (NL); Jozef Thomas Martinus van Beek, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/847,956

(22) Filed: Sep. 8, 2015

(65) Prior Publication Data

US 2017/0071017 A1    Mar. 9, 2017

(51) Int. Cl.
*H04B 11/00* (2006.01)
*H04W 76/02* (2009.01)
*H04B 17/364* (2015.01)
*H04W 4/00* (2009.01)

(52) U.S. Cl.
CPC .......... *H04W 76/023* (2013.01); *H04B 11/00* (2013.01); *H04B 17/364* (2015.01); *H04W 4/008* (2013.01)

(58) Field of Classification Search
CPC ....................................................... H04B 11/00
See application file for complete search history.

(56) References Cited

U.S. PATENT DOCUMENTS

| 6,137,887 A * | 10/2000 | Anderson | H04R 3/005 381/111 |
|---|---|---|---|
| 6,388,949 B1 * | 5/2002 | Lenhardt | A01K 79/02 116/22 A |
| 2006/0013409 A1 * | 1/2006 | Desloge | A61F 11/14 381/72 |
| 2010/0278345 A1 | 11/2010 | Alsina et al. | |
| 2014/0335789 A1 | 11/2014 | Cohen et al. | |

(Continued)

OTHER PUBLICATIONS

Roettgers, Janko; "Chromecast will use ultrasonic sounds to pair your TV with your friend's phones"; retrieved from the internet http://search.gigaom.com/tag/google-io-2014/ on Jul. 16, 2015; 3 pages (Jun. 26, 2014).

(Continued)

*Primary Examiner* — Tuan H Nguyen

(57) ABSTRACT

One example discloses an acoustic pairing device, comprising: an acoustic processor configured to receive a first acoustic signal and a second acoustic signal; a signal comparison module configured to identify a propagation delay or amplitude difference between the first and second acoustic signals; and a pairing module configured to output a pairing signal if the propagation delay or amplitude difference is between a first value and a second value. Another example discloses a method for acoustic pairing between a first device and a second device, executed by a computer programmed with non-transient executable instructions, comprising: receiving a propagation delay or amplitude difference between a first acoustic signal and a second acoustic signal; pairing the first and second devices if the propagation delay or amplitude difference is between a first value and a second value.

26 Claims, 11 Drawing Sheets

(56) References Cited

U.S. PATENT DOCUMENTS

2015/0131539 A1    5/2015  Tsfaty et al.
2015/0318874 A1*  11/2015  Donaldson ............. H04B 11/00
                                                                367/135

OTHER PUBLICATIONS

Seppala, Timothy J.; "Chromecast's ultrasonic device pairing is much simpler than it sounds"; retrieved from the internet http://www.engadget.com/2014/06/27/chromecast-ultrasonic-pairing on Jul. 16, 2015; 2 pages (Jun. 27, 2014).
Roettgers, Janko; "Ultrasonic network: your devices are talking, and you can't hear a thing"; retrieved from the internet https://gigaom.com/2013/08/09/ultrasonic-networking-your-devices-are-talking-and-you-cant-hear-a-thing/ 2 pages (Aug. 9, 2013).
Extended European Search Report for Patent Appln. No. 16184927.8 (Jan. 3, 2017).
Schweinzer, Herbert et al., "Ultrasonic Device Localization and its Potential for Wireless Sensor Network Security", Control Engineering Practice, Pergamon Press, Oxford, GB, vol. 18, No. 8, pp. 852-862, (Aug. 1, 2010).

* cited by examiner

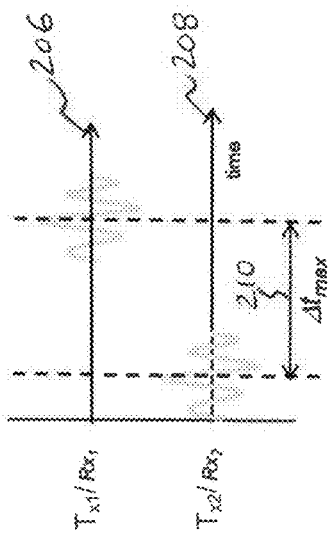
Fig. 2A
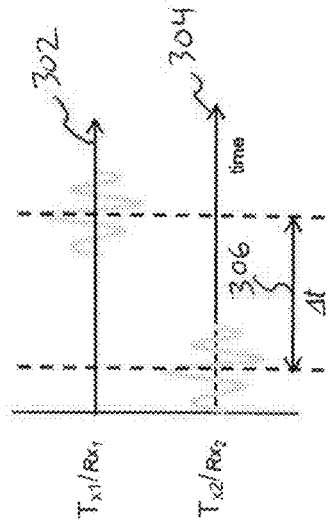
Fig. 2B
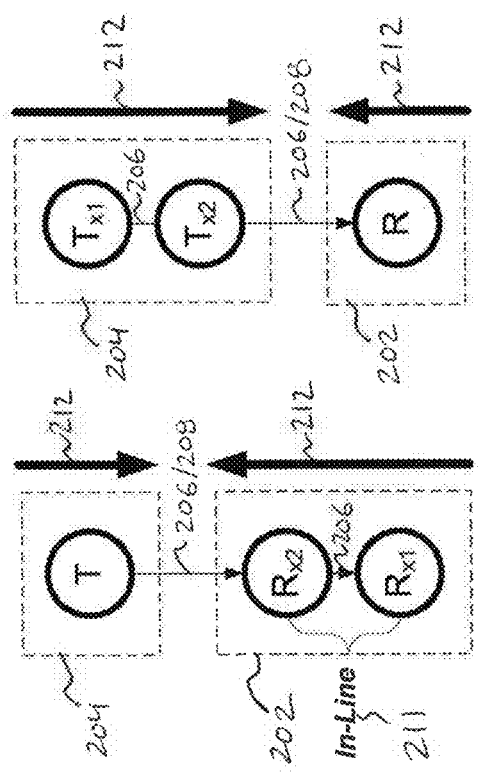
Fig. 2C
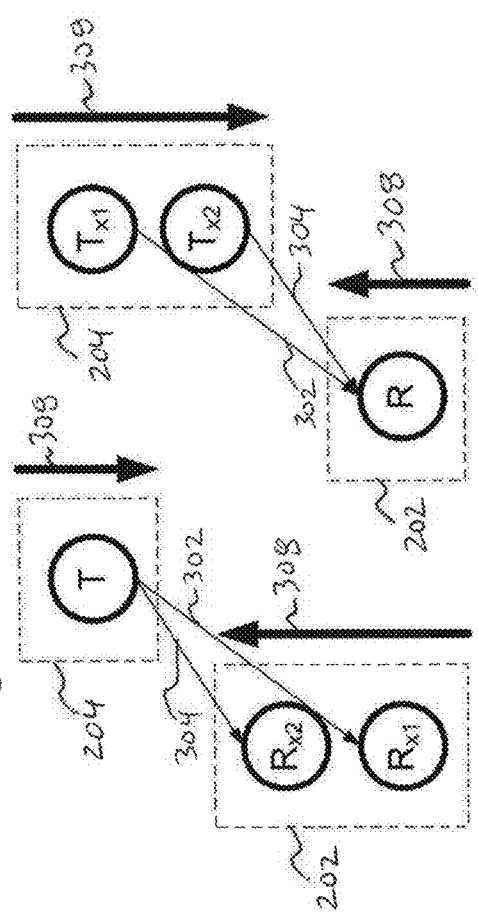
Fig. 3A
Fig. 3B
Fig. 3C

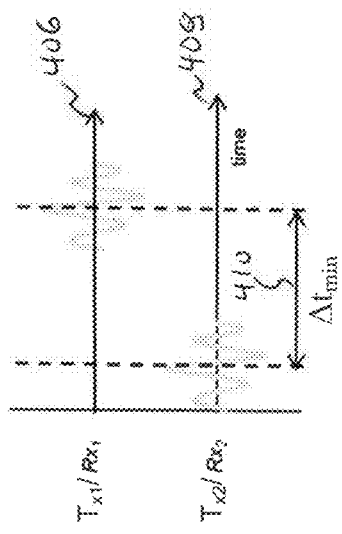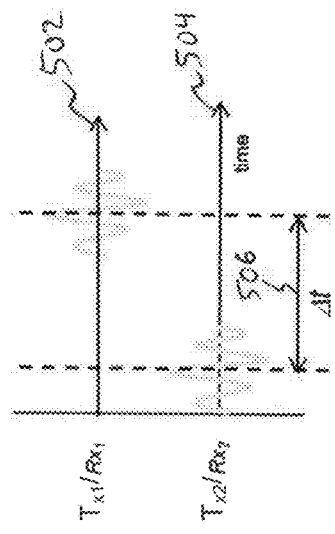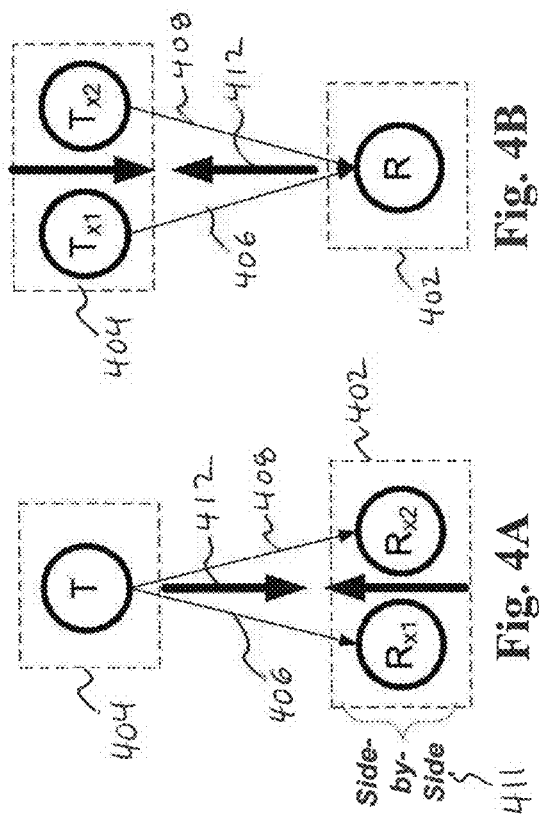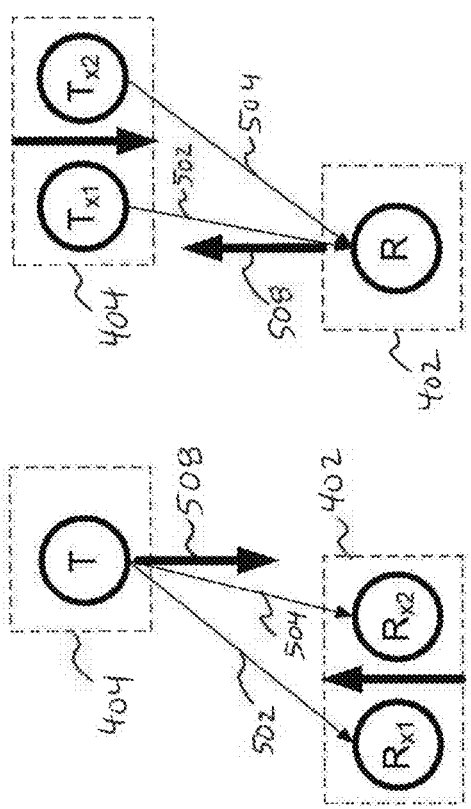
Fig. 4A  Fig. 4B  Fig. 4C
Fig. 5A  Fig. 5B  Fig. 5C

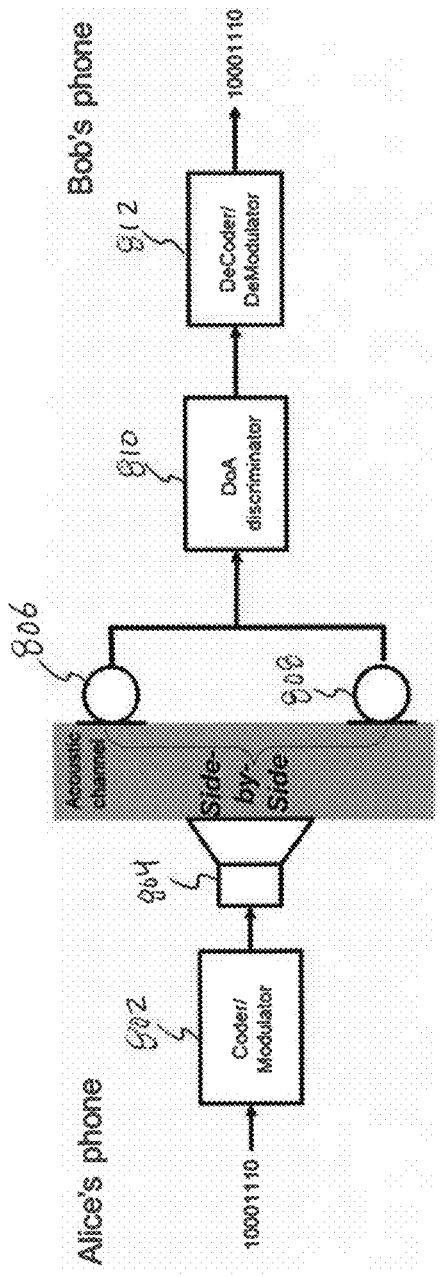
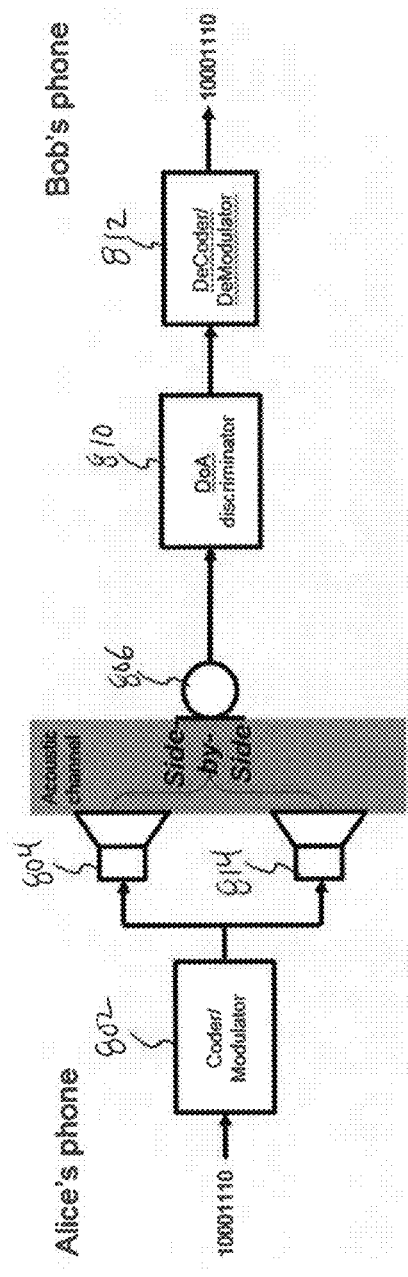
Fig. 8A
Fig. 8B

ACOUSTIC PAIRING

The present specification relates to systems, methods, apparatuses, devices, articles of manufacture and instructions for acoustic pairing.

Internet-of-Things (IoT) devices often rely on a variety of short and long range wireless RF connectivity standards such as BLE, WiFi, and ZigBee. These RF communication channels are first paired (e.g. initialized, bootstrapped, connected, etc.) before they operate in a secure and reliable fashion.

For example, imagine you are sitting on the couch at your friend's house and want to share video or audio content from your smartphone to your friend's TV screen that is located several meters away from you. Secure device pairing needs to take place since both devices are not yet connected to the same WiFi network. This pairing could involve a tedious procedure requiring non-intuitive user interaction, such as password exchange.

While wireless beacon signals can fill a whole room and other devices in the room can be paired to the beacon originating devices, such connections are indiscriminant. Such beacons are functionally just saying "here I am", and are not able to see the other devices in the room. Also, if there is more than one beacon in the same room, other devices (e.g. smartphones) attempting to select between these beacons would need to know the name of each beacon device before even selecting one for pairing. This presents complexities to such smartphones which affects a pairing process.

SUMMARY

According to an example embodiment, an acoustic pairing device, comprising: an acoustic processor configured to receive a first acoustic signal and a second acoustic signal; a signal comparison module configured to identify a propagation delay or amplitude difference between the first and second acoustic signals; and a pairing module configured to output a pairing signal if the propagation delay or amplitude difference is between a first value and a second value.

In another example embodiment, the acoustic processor is configured to receive the first and second acoustic signals from a single acoustic receiver.

In another example embodiment, the first and second acoustic signals are received from a pair of in-line acoustic transmitters; and wherein the pairing signal is generated if the propagation delay between the first and second acoustic signals is greater than a preselected delay value.

In another example embodiment, the first and second acoustic signals are received from a pair of side-by-side acoustic transmitters; and wherein the pairing signal is generated if the propagation delay between the first and second acoustic signals is less than a preselected delay value.

In another example embodiment the first and second acoustic signals are received from a pair of variably-arranged acoustic transmitters; and wherein the pairing signal is generated if the propagation delay between the first and second acoustic signals is between the first value and the second value.

In another example embodiment, the acoustic processor is configured to receive the first and second acoustic signals, respectively, from first and second acoustic receivers.

In another example embodiment, the first and second acoustic receivers are in-line; and wherein the pairing signal is generated if the propagation delay between the first and second acoustic signals is greater than a preselected delay value.

In another example embodiment, the first and second acoustic receivers are side-by-side; and wherein the pairing signal is generated if the propagation delay between the first and second acoustic signals is less than a preselected delay value.

In another example embodiment, the first and second acoustic receivers are variably-arranged; and wherein the pairing signal is generated if the propagation delay between the first and second acoustic signals is between the first value and the second value.

In another example embodiment, the pairing module configured to output a pairing signal if the propagation delay is greater than the first value.

In another example embodiment, the pairing module configured to output a pairing signal if the propagation delay is less than the second value.

In another example embodiment, the first and second acoustic signals are ultrasonic signals.

In another example embodiment, at least one of the first and second acoustic signals include at least one of: an identifier, additional data or an encryption key.

In another example embodiment, the acoustic signal input is configured to receive the first and second acoustic signals from at least one of: a microphone, a speaker, or a pressure sensor.

In another example embodiment, the propagation delay is translated into a direction-of-arrival from an acoustic transmitter; and pairing between an acoustic receiver and the acoustic transmitter is limited to when the direction-of-arrival is within an angular range.

In another example embodiment, the signal comparison module is configured to identify a distance between the acoustic pairing device and another acoustic device based on the amplitude difference between the first and second acoustic signals.

In another example embodiment, in response to the pairing signal, the acoustic pairing device at least one of: pairs with a second device; wakes-up a second device; ignores a second device; or sorts a list of devices wherein a second device is ranked first on the list.

In another example embodiment, the acoustic receiver is substantially omni-directional at a preselected ultrasound operating frequency.

In another example embodiment, the pairing signal is at least one of: an ultrasonic signal, a wireless signal, a Bluetooth signal or an optical signal and may contain additional data or an encryption key.

In another example embodiment, the first acoustic signal includes a first signal identifier and the second acoustic signal includes a second signal identifier; and the signal comparison module is configured to identify a direction of the acoustic pairing device based on a difference between the first and second signal identifiers.

In another example embodiment, the acoustic processor configured to receive a third acoustic signal; and the signal comparison module is configured to identify a direction of the acoustic pairing device based on a comparison between the first, second and third acoustic signals.

In another example embodiment, further comprising a control module configured, in response to the pairing signal, to select or manipulate a menu item.

According to a next example embodiment, a method for acoustic pairing between a first device and a second device, executed by a computer programmed with non-transient executable instructions, comprising: receiving a propagation delay or amplitude difference between a first acoustic signal and a second acoustic signal; and pairing the first and second devices if the propagation delay or amplitude difference is between a first value and a second value.

In another example embodiment, additionally receiving a second propagation delay between a third acoustic signal and a fourth acoustic signal; and pairing the first and second devices if the second propagation delay is between a third value and a fourth value.

In another example embodiment, additionally translating the propagation delay into a direction-of-arrival from the first device to the second device; and pairing the first and second devices if the direction-of-arrival is within an angular range.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIG. 2A is a first example for validating a pairing with a device having a pair of in-line acoustic receivers.

FIG. 2B is a second example for validating a pairing with a device having a pair of in-line acoustic transmitters.

FIG. 2C is an example signal delay for validating these pairings.

FIG. 3A is a first example for rejecting a pairing with a device having a pair of in-line acoustic receivers.

FIG. 3B is a second example for rejecting a pairing with a device having a pair of in-line acoustic transmitters.

FIG. 3C is an example signal delay for rejecting these pairings.

FIG. 4A is a first example for validating a pairing with a device having a pair of side-by-side acoustic receivers.

FIG. 4B is a second example for validating a pairing with a device having a pair of side-by-side acoustic transmitters.

FIG. 4C is an example signal delay for validating these pairings.

FIG. 5A is a first example for rejecting a pairing with a device having a pair of side-by-side acoustic receivers.

FIG. 5B is a second example for rejecting a pairing with a device having a pair of side-by-side acoustic transmitters.

FIG. 5C is an example signal delay for rejecting these pairings.

FIGS. 8A and 8B are example embodiments of devices capable of pairing using an ultrasound signal.

Figure 1:
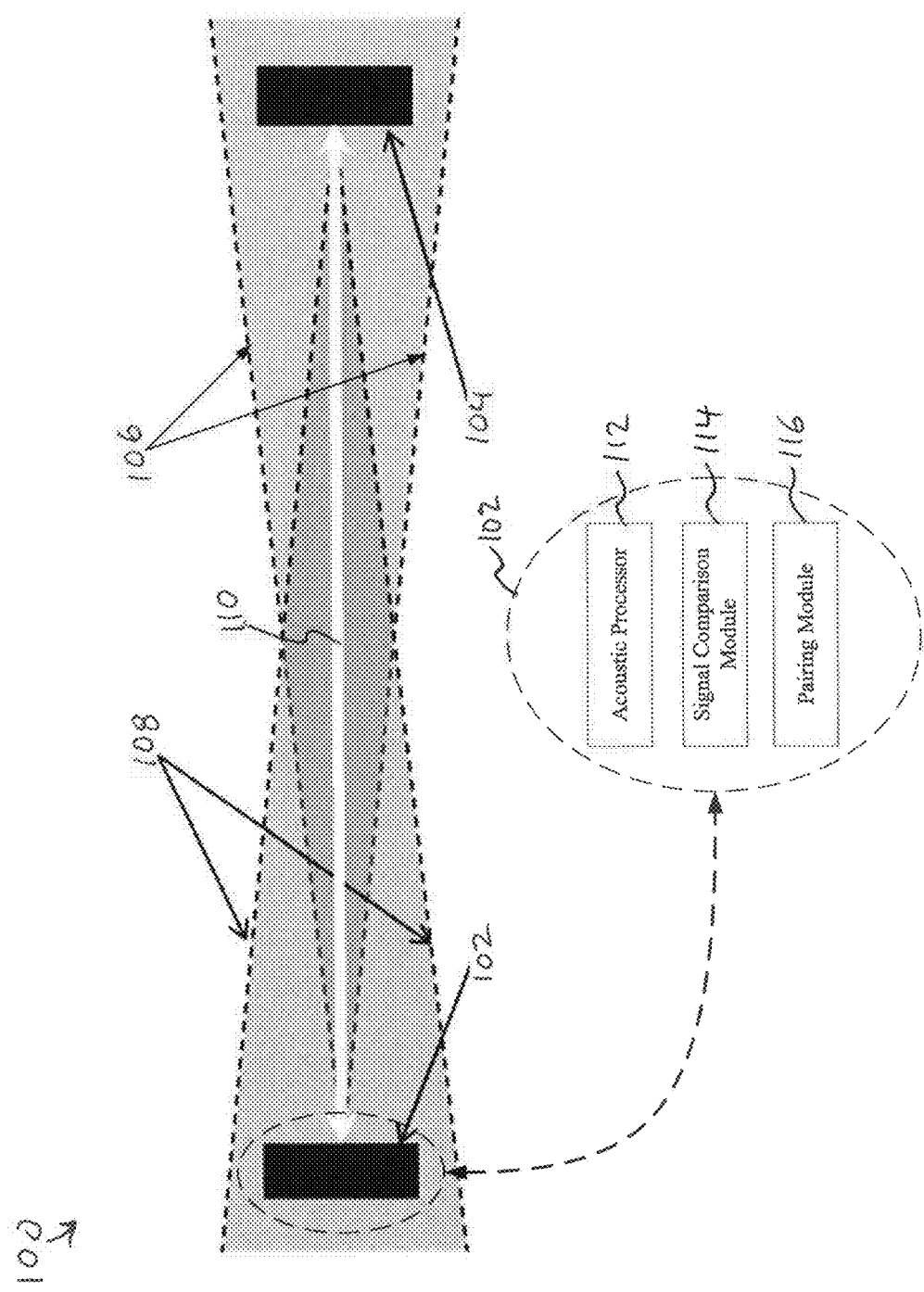
FIG. 1 is an example set of angular threshold ranges for acoustic pairing.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Directional pairing (i.e. "point and connect") with other devices, however, would benefit device pairing, such as between a smartphone and at smart-TV. Directional "point and connect" pairing process, enables a user to be selective to which device to pair with.

Using directional pairing, one could remain comfortably seated and simply point a smartphone toward another device, such as a TV, thereby selecting the TV-set as the target for data transfer over e.g. the Wi-Fi network, and start sharing content immediately. As if your smartphone were a remote control.

Example embodiments of directional pairing include:

1) Pairing two device to exchange data (e.g. point a smartphone at a mannequin to get information about what the mannequin is displaying).

2) Using ultrasound-pointing to wake-up a device (e.g. point a smartphone to wake-up a TV and also auto-start a remote control app on the smartphone).

3) Ignoring other beacons in a room that might "wake-up" your smartphone (i.e. beacons can generate a constant stream of messages that would otherwise bombard a smartphone screen with pop-ups and thereby interfering with other smartphone activities.

4) Re-sorting/re-ranking potential pairing candidates by their direction with respect to a current direction of the smartphone. For example, with a large number of ultrasonic devices in a room a user without directional pairing may need to sort through a long list of potential pairings before selecting one. However with directional pairing one could then point at a device to be paired with and the device comes to the top of that list.

5) Present available devices on a local map, such as in a shopping mall, and then point to a device to be connected with.

6) Walking in front of or past (i.e. within the angular range of) another device. While various versions of actively pointing at another device have been mentioned above, passive pointing occurs when a fixed device triggers a pairing event in response to another device passing within a field of view (i.e. an angular range of) the fixed device. For example, a smartphone user could walk up to a front of a TV and the TV itself could then initiate a pairing event between the TV and the smartphone.

Devices can be paired using either a one-way or two way handshake protocol.

In a one-way handshake protocol, by pointing a smartphone toward an appliance a user is able to control the appliance. For example, when a light bulb is enabled with an ultrasound emitter a user can turn the light bulb on or off by simply pointing at it. In this case the pointing is used to control a single light bulb, and not all light bulbs that are in proximity of the user. Thus some pairing can be made more secure than others.

In a two-way handshake protocol, both devices need to be pointed at each other, after which the two devices would pair automatically. No device pairing would take place when only one device is pointed to the other. In another example embodiment, a device could still prompt a user for confirmation before pairing.

Ultrasonic "point-and-pair" using smartphone speakers and microphones, as will be discussed herein, is a form of out of band pairing that makes use of human-perceptible feedback provided by the visual alignment of the smartphone with the device to be paired or controlled in a user friendly and intuitive way.

With "point-and-pair", angles can be discriminated and angular thresholds thereby used to determine a direction-of-arrival (DoA) of an ultrasonic pulse and trigger device-to-device pairing. The direction of arrival can be inferred from the time delay recorded between microphones and is used to check whether the handheld is pointed to the sound beacon.

FIG. 1 is an example set of angular threshold ranges for acoustic pairing. An acoustic pairing system 100 with a first acoustic pairing device 102 and a second acoustic pairing device 104. The first device 102 has a first angular range 106 within which it will pair, and the second device 104 has a second angular range 108 within which it will pair. Devices within these angular ranges are defined as pointing toward each other.

When the devices 102, 104 are pointing toward each other, one or more pairing signals 110 are generated. As mentioned above, pairing may require either a one-way or two-way handshake protocol. Within at least one of the devices 102, 104 is an acoustic processor 112, a signal comparison module 114, and a pairing module 116. Operation of the processor 112 and these modules 114, 116 is discussed further with respect to FIGS. 2 through 7.

FIG. 2A is a first example for validating a pairing with a device 202 having a pair of in-line 211 acoustic receivers (Rx1 and Rx2). FIG. 2B is a second example for validating a pairing with a device 204 having a pair of in-line acoustic transmitters (Tx1 and Tx2). FIG. 2C is an example signal delay 210 for validating these pairings. FIGS. 2A, 2B and 2C are discussed together.

In FIG. 2A the first acoustic pairing device 202 includes a pair of in-line 211 acoustic receivers (Rx1 and Rx2) for receiving a first acoustic signal 206 and a second acoustic signal 208 from the second acoustic pairing device 204. A first propagation delay 210 is shown in FIG. 2C. Since the acoustic receivers (Rx1 and Rx2) are in-line 211, the pairing module 116 will output a pairing signal to the second acoustic pairing device 204 only if the signal comparison module 114 determines that the first propagation delay 210 is greater than or equal to a threshold delay value.

In FIGS. 2A and 2B since the devices 202, 204 are pointing exactly toward 212 each other, the first propagation delay 210 will be at a maximum delay value which is, by definition, greater than or equal to the threshold delay value.

In other examples, if the devices 202, 204 point somewhat away from each other, but still within a predefined angular range, the pairing module 116 is configured to still classify the devices 202, 204 as pointing toward 212 each other. In these other examples, while the first propagation delay 210 will be a smaller delay, such delay will still be greater than the threshold delay value.

In FIG. 2B the first acoustic pairing device 202 includes a single acoustic receiver for receiving a first acoustic signal 206 and a second acoustic signal 208 from the second acoustic pairing device 204 which includes a pair of in-line acoustic transmitters (Tx1 and Tx2). Since the devices 202, 204 are still pointing toward 212 each other, the first propagation delay 210 will still be at the maximum delay value, shown in FIG. 2C, and a pairing signal will be sent to the second device 204.

In one example embodiment, even though only one of the devices has two acoustic transducers, another device having only one transducer can still measure a propagation delay from the device which has two. Thus the device making a "pairing decision" need not itself have two transducers.

An accuracy by which the direction of arrival is determined is based on an accuracy by which the propagation delay of the two acoustic signals can be recorded. A relative accuracy of the recorded time delay is based on a ratio of the minimum signal length and the distance between the two transmitters or receivers. A minimum signal length is set by the wavelength and/or bandwidth that can be supported. For example involving smartphones or wearables, a maximum distance between acoustic transducers (e.g. transceivers) is set by the dimensions of the smartphone or wearable and is typically <10 cm.

The acoustic transmitters (Tx1 and Tx2) and/or receivers (Rx1 and Rx2) in certain example embodiments can be two microphones, two speakers, one microphone and one speaker, such as currently exist on smartphones, computers, RFID tags, and wearable devices. Acoustically sensitive pressure sensors are also possible. Such acoustic transmitters/receivers can be directional or omni-directional. More than three acoustic transducers can also be used.

In some example embodiments, more than three total acoustic transducers could distinguish whether the devices 202, 204 are pointing either exactly toward or exactly away from each other, such that a pairing signal is only sent if the devices 202, 204 are pointing exactly toward each other. In other embodiments, pairing may be permitted either if the devices 202, 204 are exactly toward or exactly away from each other.

While smartphone speakers and microphones are most sensitive in the audible part of the sound spectrum (<17 kHz), they can also be used for frequencies >17 kHz, making ultrasound data communication unobtrusive to the human ear. Ultrasound frequencies are generally within the tens of kHz range, and the wavelength of a 30 kHz ultrasonic acoustic signal is in the order of 1 cm.

In some example embodiments, the upper limit of the ultrasound frequency using existing smartphone speaker-microphone combinations is currently affected by the audio sampling frequency of the AD and DA converters used for digitization the sound signals. However, increasing this sample frequency allows for ultrasound generation and detection up to ~50 kHz. Data rates achievable with ultrasound communication are typically only a few kb/s, because of the small frequency bandwidth. Nevertheless, these data rates are is sufficiently high to support the "point-and-pair" use case. The same ultrasonic channel in another embodiment is also used to exchange data, such as the secure exchange of an encryption key.

In one example, ultrasound data passed within the acoustic signals 206, 208 is just a low data rate handshake (e.g. a pin-code), which permits the devices 202, 204 to communicate over another high data rate network, such as a WiFi, a Bluetooth, a cellular, or a hardwired network.

FIG. 3A is a first example for rejecting a pairing with a device 202 having a pair of in-line acoustic receivers (Rx1 and Rx2). FIG. 3B is a second example for rejecting a pairing with a device having a pair of in-line acoustic transmitters (Tx1 and Tx2). FIG. 3C is an example signal delay for rejecting these pairings. FIGS. 3A, 3B and 3C are discussed together.

In FIG. 3A the first acoustic pairing device 202 includes the pair of in-line 211 acoustic receivers (Rx1 and Rx2) for receiving a third acoustic signal 302 and a fourth acoustic signal 304 from the second acoustic pairing device 204. A second propagation delay 306 is shown in FIG. 3C. Since the acoustic receivers (Rx1 and Rx2) are in-line 211, the pairing module 116 will output a pairing signal to the second acoustic pairing device 204 only if the signal comparison module 114 determines that the second propagation delay 306 is greater than or equal to the previously mentioned threshold delay value.

In FIGS. 3A and 3B since the devices 202, 204 are not pointing toward 308 each other, the second propagation delay 306 will be at a delay value which is less than the threshold delay value, and thus the pairing signal will not be sent and the devices 202, 204 will not be paired. This is because the second propagation delay 306 indicates that the devices are outside of the previously mentioned predefined angular range, and thus the pairing module 116 is configured to classify the devices 202, 204 as not pointing toward 308 each other.

In FIG. 3B the first acoustic pairing device 202 includes a single acoustic receiver for receiving the third acoustic signal 302 and the fourth acoustic signal 304 from the second acoustic pairing device 204 which includes a pair of in-line acoustic transmitters (Tx1 and Tx2). Since the devices 202, 204 are still not pointing toward 308 each other, the second propagation delay 306 will still be less than the threshold delay value and a pairing signal will not be sent to the second device 204.

FIG. 4A is a first example for validating a pairing with a device having a pair of side-by-side 411 acoustic receivers (Rx1 and Rx2). FIG. 4B is a second example for validating a pairing with a device having a pair of side-by-side acoustic transmitters (Tx1 and Tx2). FIG. 4C is an example signal delay for validating these pairings. FIGS. 4A, 4B and 4C are discussed together.

In FIG. 4A the first acoustic pairing device 402 includes a pair of side-by-side 411 acoustic receivers (Rx1 and Rx2) for receiving a first acoustic signal 406 and a second acoustic signal 408 from the second acoustic pairing device 404. A first propagation delay 410 is shown in FIG. 4C. Since the acoustic receivers (Rx1 and Rx2) are side-by-side 411, the pairing module 116 will output a pairing signal to the second acoustic pairing device 404 only if the signal comparison module 114 determines that the first propagation delay 410 is less than or equal to a threshold delay value.

In FIGS. 4A and 4B since the devices 402, 404 are pointing exactly toward 412 each other, the first propagation delay 410 will be at a minimum delay value which is, by definition, less than or equal to the threshold delay value.

In other examples, if the devices 402, 404 point somewhat away from each other, but still within a predefined angular range, the pairing module 116 is configured to still classify the devices 402, 404 as pointing toward 412 each other. In these other examples, while the first propagation delay 410 will be a larger delay, such delay will still be less than the threshold delay value.

In FIG. 4B the first acoustic pairing device 402 includes a single acoustic receiver for receiving a first acoustic signal 406 and a second acoustic signal 408 from the second acoustic pairing device 404 which includes a pair of side-by-side acoustic transmitters (Tx1 and Tx2). Since the devices 402, 404 are still pointing toward 412 each other, the first propagation delay 410 will still be at the minimum delay value, shown in FIG. 4C, and a pairing signal will be sent to the second device 404.

FIG. 5A is a first example for rejecting a pairing with a device having a pair of side-by-side acoustic receivers (Rx1 and Rx2). FIG. 5B is a second example for rejecting a pairing with a device having a pair of side-by-side acoustic transmitters (Tx1 and Tx2). FIG. 5C is an example signal delay for rejecting these pairings. FIGS. 5A, 5B and 5C are discussed together.

In FIG. 5A the first acoustic pairing device 402 includes the pair of side-by-side 411 acoustic receivers (Rx1 and Rx2) for receiving a third acoustic signal 502 and a fourth acoustic signal 504 from the second acoustic pairing device 404. A second propagation delay 506 is shown in FIG. 5C. Since the acoustic receivers (Rx1 and Rx2) are side-by-side 411, the pairing module 116 will output a pairing signal to the second acoustic pairing device 404 only if the signal comparison module 114 determines that the second propagation delay 506 is less than or equal to the previously mentioned threshold delay value.

In FIGS. 5A and 5B since the devices 402, 404 are not pointing toward 508 each other, the second propagation delay 506 will be at a delay value which is greater than the threshold delay value, and thus the pairing signal will not be sent and the devices 402, 404 will not be paired. This is because the second propagation delay 506 indicates that the devices are outside of the previously mentioned predefined angular range, and thus the pairing module 116 is configured to classify the devices 402, 404 as not pointing toward 508 each other.

In FIG. 5B the first acoustic pairing device 402 includes a single acoustic receiver for receiving the third acoustic signal 502 and the fourth acoustic signal 504 from the second acoustic pairing device 404 which includes a pair of side-by-side acoustic transmitters (Tx1 and Tx2). Since the devices 402, 404 are still not pointing toward 508 each other, the second propagation delay 506 will still be greater than the threshold delay value and a pairing signal will not be sent to the second device 404.

While "in-line" and "side-by-side" pairing embodiments have been discussed above, in another embodiment pairing is triggered when the propagation delay between acoustic signals is in between two preset delay values. In geometric terms, pairing is triggered when the devices to be paired are on predefined cone. The "in-line" and "side-by-side" embodiments can be thought of as special cases of this "cone" embodiment (i.e. the "side-by-side" embodiment is described when the cone angle is 180 degrees, and the "in-line" embodiment is described when the cone angle is 0 degrees.

"Variably-arranged" acoustic transducer embodiments are also possible. "Variably-arranged" is herein defined to include any random or patterned arrangement of acoustic transducers on a device.

In addition to the directional of arrival calculated based on a difference in delay (e.g. phase delay) between two acoustic signals, a distance between an acoustic transmitter/emitter and an acoustic receiver/detector can be calculated by applying the Inverse Square Law to a difference between the acoustic signal's amplitude free-space-loss attenuations.

Because sound waves decrease in amplitude the further they travel from their source, a difference in path length from the two acoustic signals can be calculated from the attenuation in their respective measured amplitudes.

For example, a mobile terminal with a microphone spacing of millimeters or inches, will discriminate between emitters in the near-field and those in the far-field. This discrimination would be useful in several ways; it may be desirable to pair with the closest of multiple targets, or it may be desirable only to wake-up when the source is closer than a specified distance. The distance estimation could be used in place of the directional qualifier or in addition to it.

Figure 6A:
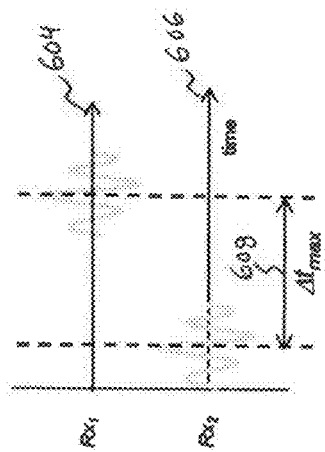
FIG. 6A is an example pictorial representation of FIG. 2A and the example signal delay of FIG. 2C.
Figure 6A:
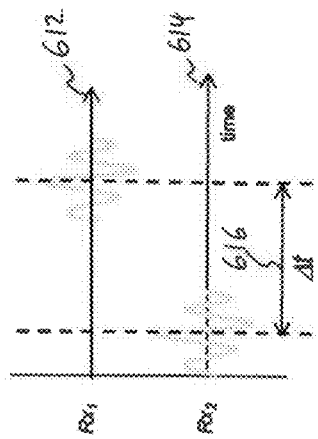
Figure 6A:
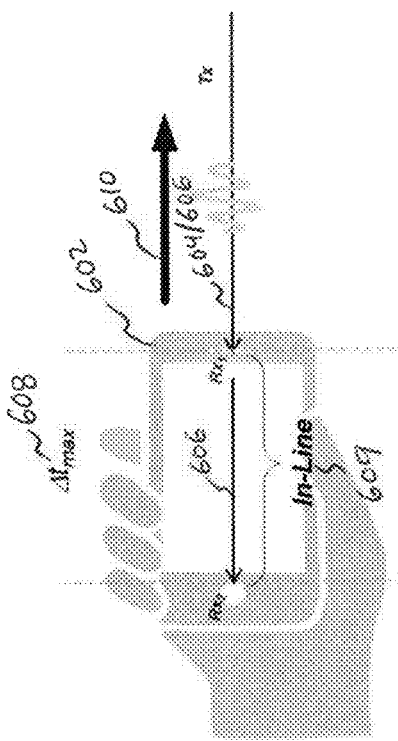
Figure 6B:
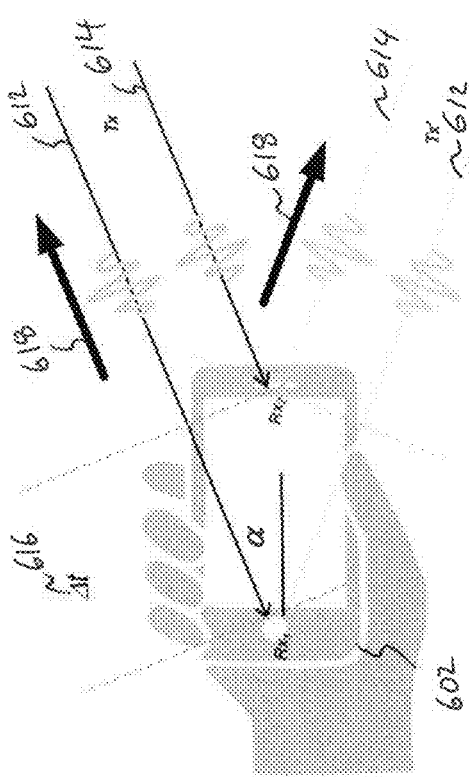
FIG. 6B is an example pictorial representation of FIG. 3A and the example signal delay of FIG. 3C.

FIG. 6A is an example pictorial representation of FIG. 2A and the example signal delay of FIG. 2C; and FIG. 6B is an example pictorial representation of FIG. 3A and the example signal delay of FIG. 3C.

In FIG. 6A the first acoustic pairing device 602 includes a pair of in-line 609 acoustic receivers (Rx1 and Rx2) for receiving a first acoustic signal 604 and a second acoustic signal 606 from the second acoustic pairing device (not shown). A first propagation delay 608 is also shown. Since the acoustic receivers (Rx1 and Rx2) are in-line 609, a pairing module within the device 602 will output a pairing signal to the second acoustic pairing device only if a signal comparison module determines that the first propagation delay 608 is greater than or equal to a threshold delay value. Since the first device 602 and second device are pointing toward 610 each other, the first propagation delay 608 will be at a maximum delay value which is, by definition, greater than or equal to the threshold delay value.

In FIG. 6B the first acoustic pairing device 602 is not pointed at 618 the second acoustic pairing device (not shown). Thus the first acoustic pairing device 602 receives a third acoustic signal 612 and a fourth acoustic signal 614 from the second acoustic pairing device. A second propagation delay 616 is also shown. Since the first device 602 and second device are not pointing toward 618 each other, the second propagation delay 616 will be at a delay value which is less than the threshold delay value, and thus the pairing signal will not be sent and the first device 602 and second device will not be paired.

In alternate embodiment, the propagation delays 608, 616 are translated into an angle of arrival. In this example, a first smartphone 602 is to be paired with a second smartphone (not shown) based on a calculated angle of arrival of an incoming ultrasound signal. This is realized using two or more microphones on the first smartphone 602 that record the arrival time of the incoming sound from the second smartphone.

The angle of arrival, a can be inferred from the distance, D between the microphones and the difference in arrival time, $\Delta t$ using the Equation (1) relation, where "c" the speed of sound in air, $$\cos\alpha = \frac{c\Delta t}{D} \quad \text{Equation (1)}$$

This equations typically has two solutions $\alpha$ and $-\alpha$ and it is therefore not possible to determine whether the beacon is located at Tx or Tx', see FIG. 6B, and hence there is ambiguity in determining the direction of arrival.

The ambiguity is removed when the microphones on the first smartphone are aligned to the sound beacon on the second smartphone, see FIG. 6A. In this case, the user aligns the phone to the target thereby maximizing $\Delta t$, and hence, $$\Delta t = \frac{D}{c} \quad \text{Equation (2)}$$

For this configuration only one solution $\alpha=0$ exists and thus the smartphone is pointed directly at the transmitting beacon (not shown).

In another example embodiment, a similar procedure can be defined using two speakers on the first smartphone and one remote microphone on the second smartphone. In this case each speaker sends out a unique identifier. The time delay $\Delta T$ between the transmissions of these identifiers is known a priori. The microphone records the difference in arrival time of both identifiers, subtracts $\Delta T$, and infers angle $\alpha$.

FIGS. 7A, 7B, 7C and 7D depict an example out of band (OOB) pairing and rejection protocol between three devices. The "point-and-pair" OOB pairing procedure can be illustrated through the pairing of two phones in 4 steps.

Figure 7A:
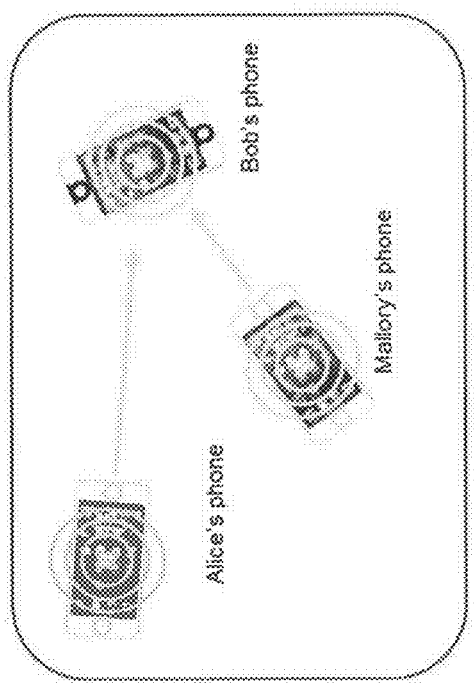
FIGS. 7A, 7B, 7C and 7D depict an example out of band (OOB) pairing and rejection protocol between three devices.

FIG. 7A illustrates Step 1 where several phones are in ultrasonic proximity (i.e. can receive the ultrasonic signals) but not connected. The speakers on the phone are continuously emitting a unique ultrasound identifier (ultrasound-ID) while the microphones are always-on and are able to recognize ultrasound-ID that is transmitted by the other phones.

Figure 7B:
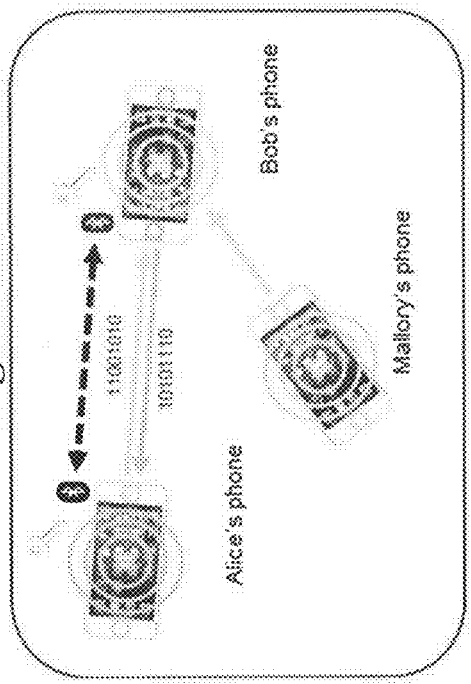

FIG. 7B illustrates Step 2 where some devices indicate that they want to pair through a "pointing gesture". In this case Alice and Mallory both indicate that they want to pair with Bob's phone by pointing their phone to Bob's. The ultrasound-ID from Bob's phone is accepted by both Alice's and Mallory's phones since direction of arrival of Bob's ultrasound-ID is within predefined limits.

Figure 7C:
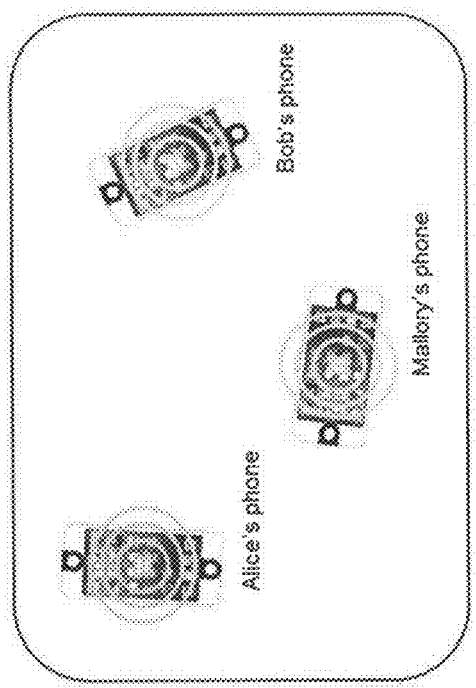

FIG. 7C illustrates Step 3 where Bob indicates that he wants to pair with Alice's and not with Mallory's phone by pointing his phone back to Alice's. This "pointing-back gesture" exclusively selects one of the two devices to pair with.

Alice's ultrasound-ID is accepted by Bob's phone since angle-of-arrival of ultrasound-ID is within predefined angular limits. However, Mallory's ultrasound-ID is rejected by Bob's phone since direction of arrival of ultrasound-ID is outside predefined angular limits.

Figure 7D:
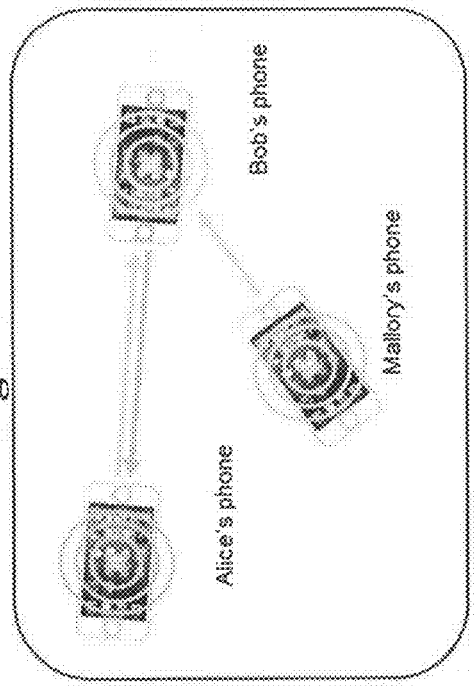

FIG. 7D illustrates Step 4 where an encryption key exchange takes place between Alice and Bob over the ultra-sound channel using known protocols, such as the Diffie-Hellman key-exchange protocol. With the created keys a secured Bluetooth, BLE, ZigBee or WiFi channel is set up between Alice's and Bob's phone and device pairing is completed.

FIGS. 8A and 8B are example embodiments of devices capable of pairing using an ultrasound signal.

FIG. 8A shows an example embodiment where one speaker 804 is used as an acoustic transmitter and two microphones 806, 808 are used as acoustic receivers. In this example embodiment, digital signal processing (DSP) is used to infer the direction of arrival and (de)coding the ultrasound-ID and other data needed for key exchange. These DSP algorithms are implemented in software or hardcoded in hardware on a chip containing a micro-controller or a DSP processor.

The ultrasound-ID or other data is first coded 802 (e.g. using techniques such as OFDM, CDMA, PSK, FSK) and modulated up to a carrier frequency that is preferably in the ultra-sound range thereby making the signal inaudible when it is transmitted by a speaker 804. At the receiver side, the modulated and coded signal is received by the two microphones 806, 808.

A direction of arrival discriminator module 810 determines whether the direction of arrival of the received data package is within the pre-defined angular limits. If so, the data is further processed 812 in order to retrieve the data bits that are required for e.g. generating an encryption key.

FIG. 8B shows an example embodiment where two speaker 804, 814 are used as acoustic transmitters and one microphone 806 is used as acoustic receiver. FIG. 8B is otherwise similar to FIG. 8A.

Figure 9A:
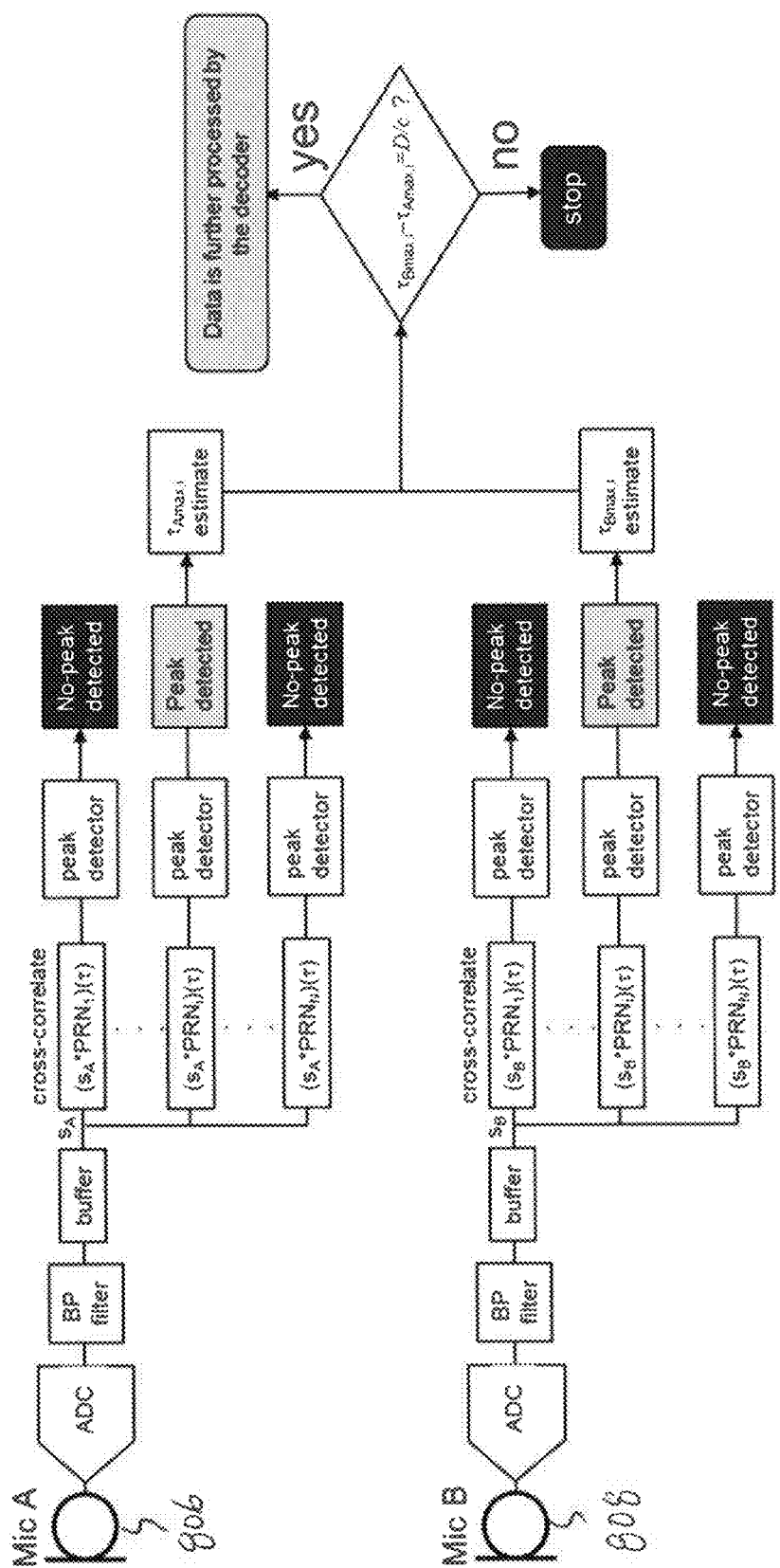
FIG. 9A is a more detailed example embodiment of "Bob's phone" in FIG. 8A.

FIG. 9A is a more detailed example embodiment of "Bob's phone" in FIG. 8A.

First, in FIG. 9A, the signal received by the two microphones 806, 808 is digitized in the ADC and band-pass filtered. The data are temporarily stored in a buffer and cross-correlated with a priori known ultrasound-IDs. In this particular case, the ultrasound-IDs consist of pseudo-random noise (PRN). A cross-correlation will be detected by the peak detector when the ultrasound-ID recorded by the microphone A matches one of the stored PRNs, in this case $PRN_i$. The location in time where the cross-correlations peaks is recorded as $\tau_{A,max}$. The $\tau_{A,max}$ is compared with $\tau_{B,max}$, which is the position in time where the cross correlation between $PRN_i$ and the signal recorded by microphone B peaks. The direction of arrival is qualified to be valid when the phone is pointed to the beacon, which is equivalent to:

$$\tau_{Amax} - \tau_{Bmax} \approx \frac{D}{c} \qquad \text{Equation (3)}$$

When direction of arrival is valid then incoming data is further processed by the decoder and data bits are retrieved for e.g. generating the encryption key.

Figure 9B:
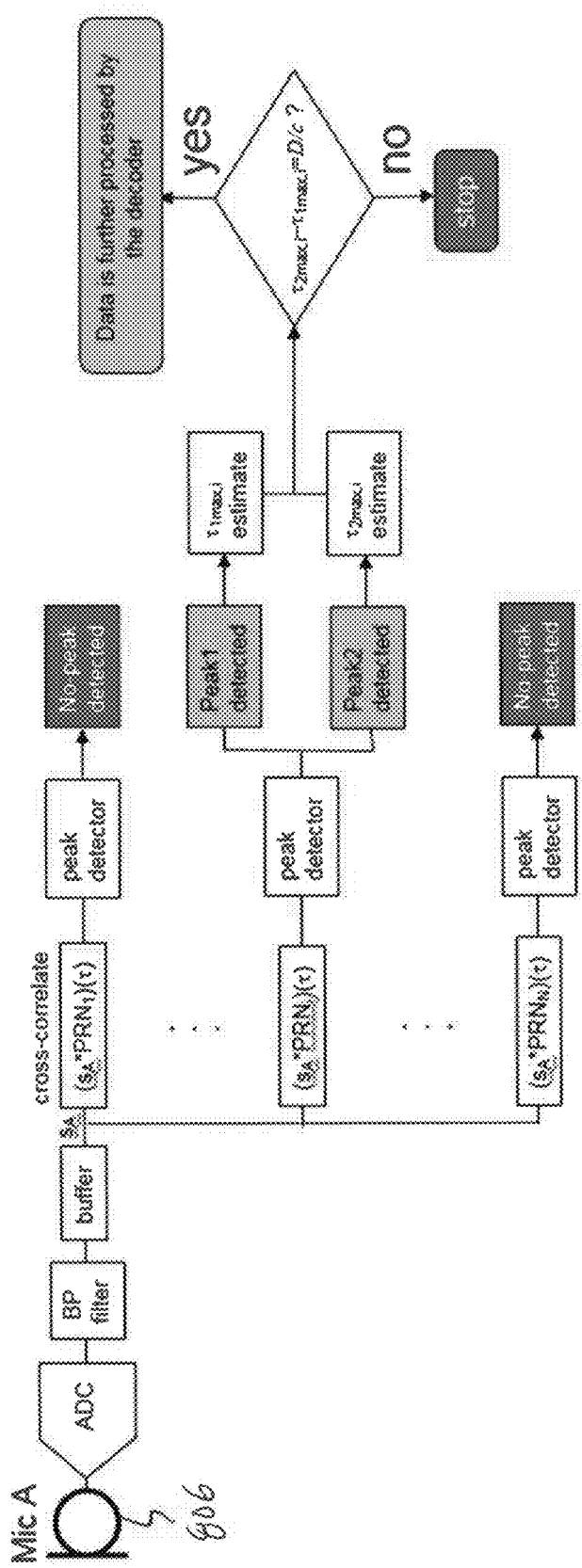
FIG. 9B is a more detailed example embodiment of "Bob's phone" in FIG. 8B.

FIG. 9B is a more detailed example embodiment of "Bob's phone" in FIG. 8B. The FIG. 9B embodiment operates in a similar way to one of the microphone paths discussed with respect to FIG. 9A.

Figure 10:
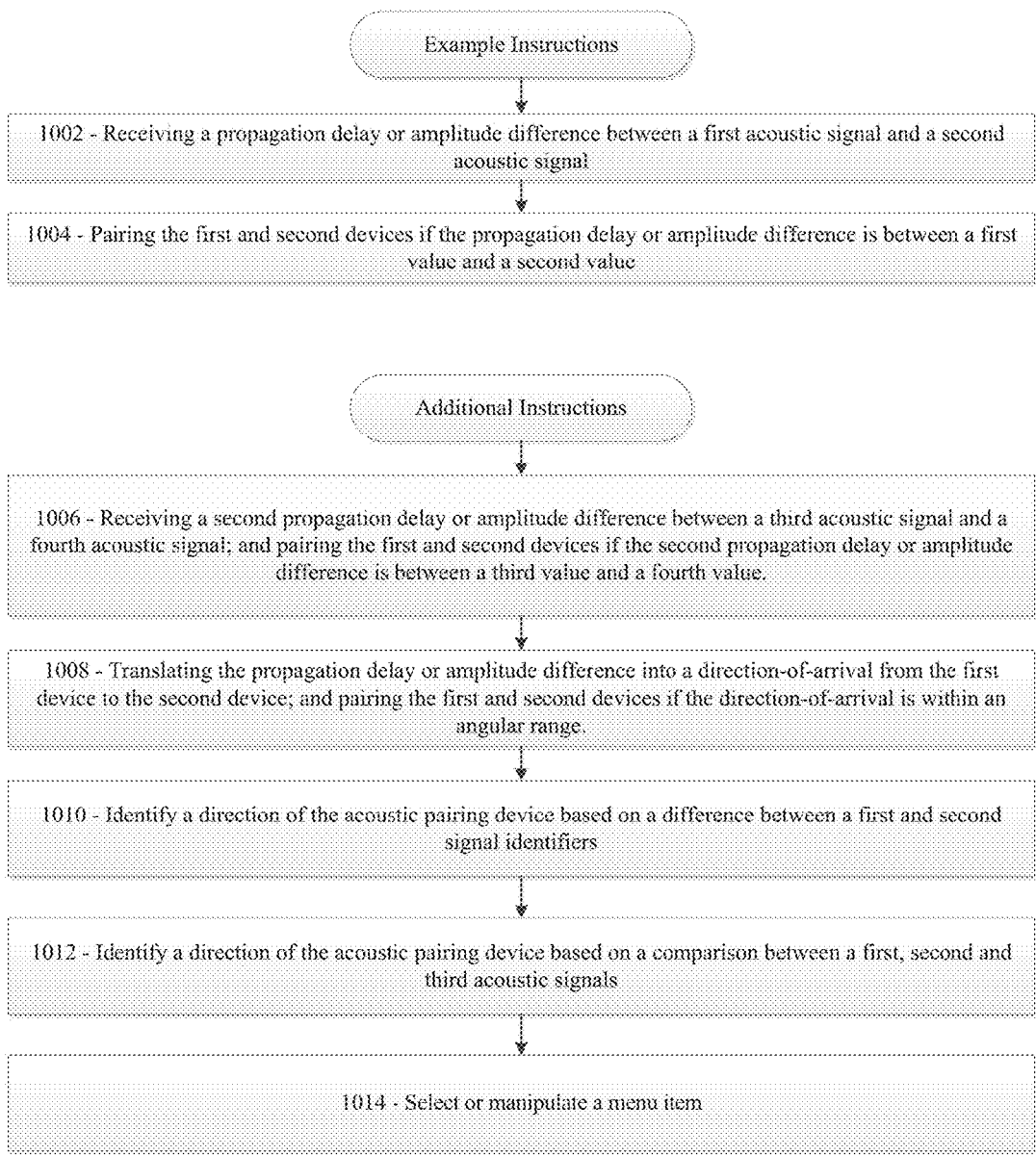
FIG. 10 is an example list of instructions for acoustic pairing.

FIG. 10 is an example list of instructions for acoustic pairing. The order in which the instructions are discussed does not limit the order in which other example embodiments implement the instructions unless otherwise specifically stated. Additionally, in some embodiments the instructions are implemented concurrently.

A first example instruction set begins in 1002, by receiving a propagation delay between a first acoustic signal and a second acoustic signal. Next, in 1004, pairing the first and second devices if the propagation delay is between a first delay value and a second delay value.

The instructions can be augmented or replaced with one or more of the following additional instructions, presented in no particular order: 1006—receiving a second propagation delay between a third acoustic signal and a fourth acoustic signal; and pairing the first and second devices if the second propagation delay is between a third delay value and a fourth delay value. 1008—translating the propagation delay into a direction-of-arrival from the first device to the second device; and pairing the first and second devices if the direction-of-arrival is within an angular range. 1010—identify a direction of the acoustic pairing device based on a difference between a first and second signal identifiers. 1012—identify a direction of the acoustic pairing device based on a comparison between a first, second and third acoustic signals. 1014—select or manipulate a menu item.

Figure 11:
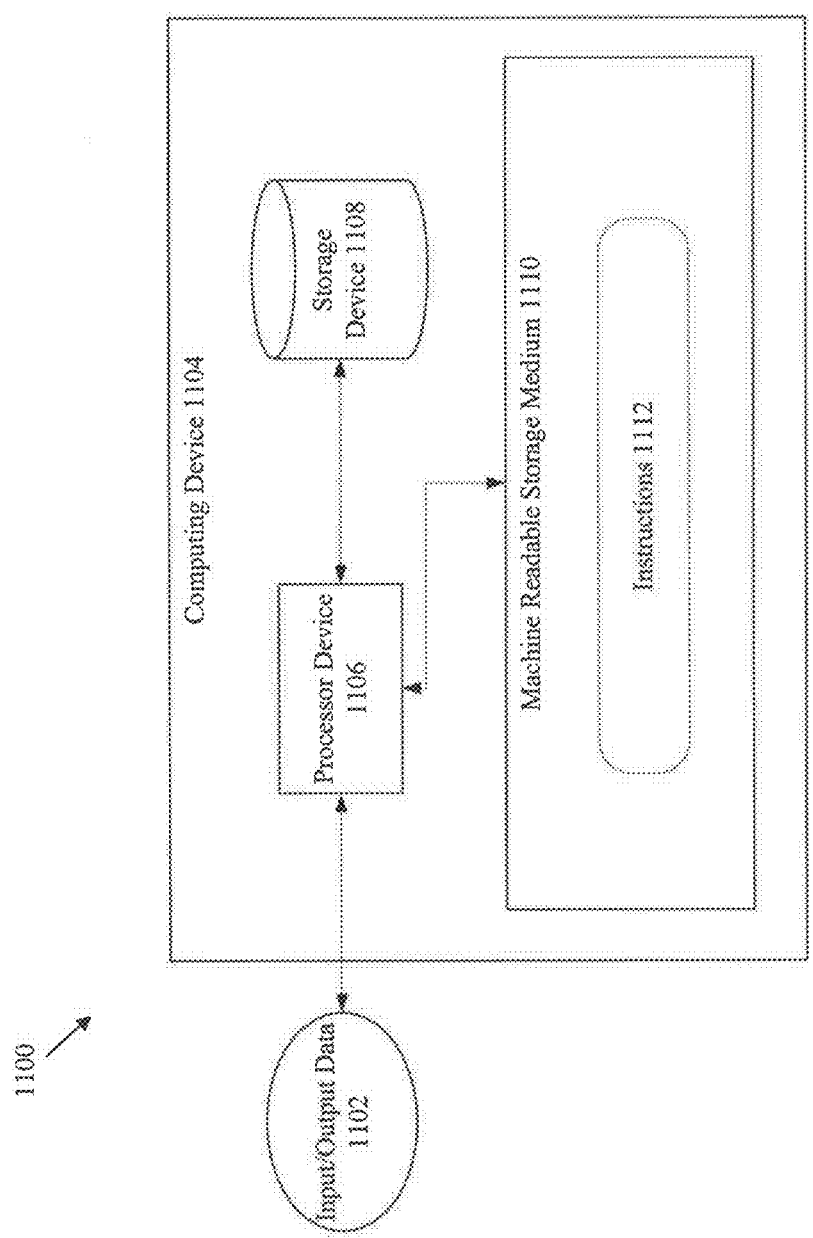
FIG. 11 is an example system for hosting instructions for acoustic pairing.

FIG. 11 is an example system 1100 for hosting instructions for acoustic pairing. The system 1100 shows an input/output data 1102 interface with an electronic apparatus 1104. The electronic apparatus 1104 includes a processor 1106, a storage device 1108, and a non-transient machine-readable storage medium 1110. The machine-readable storage medium 1110 includes instructions 1112 which control how the processor 1106 receives input data 1102 and transforms the input data into output data 1102, using data within the storage device 1108. Example instructions 1112 stored in the machine-readable storage medium 1110 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

Figure 12:
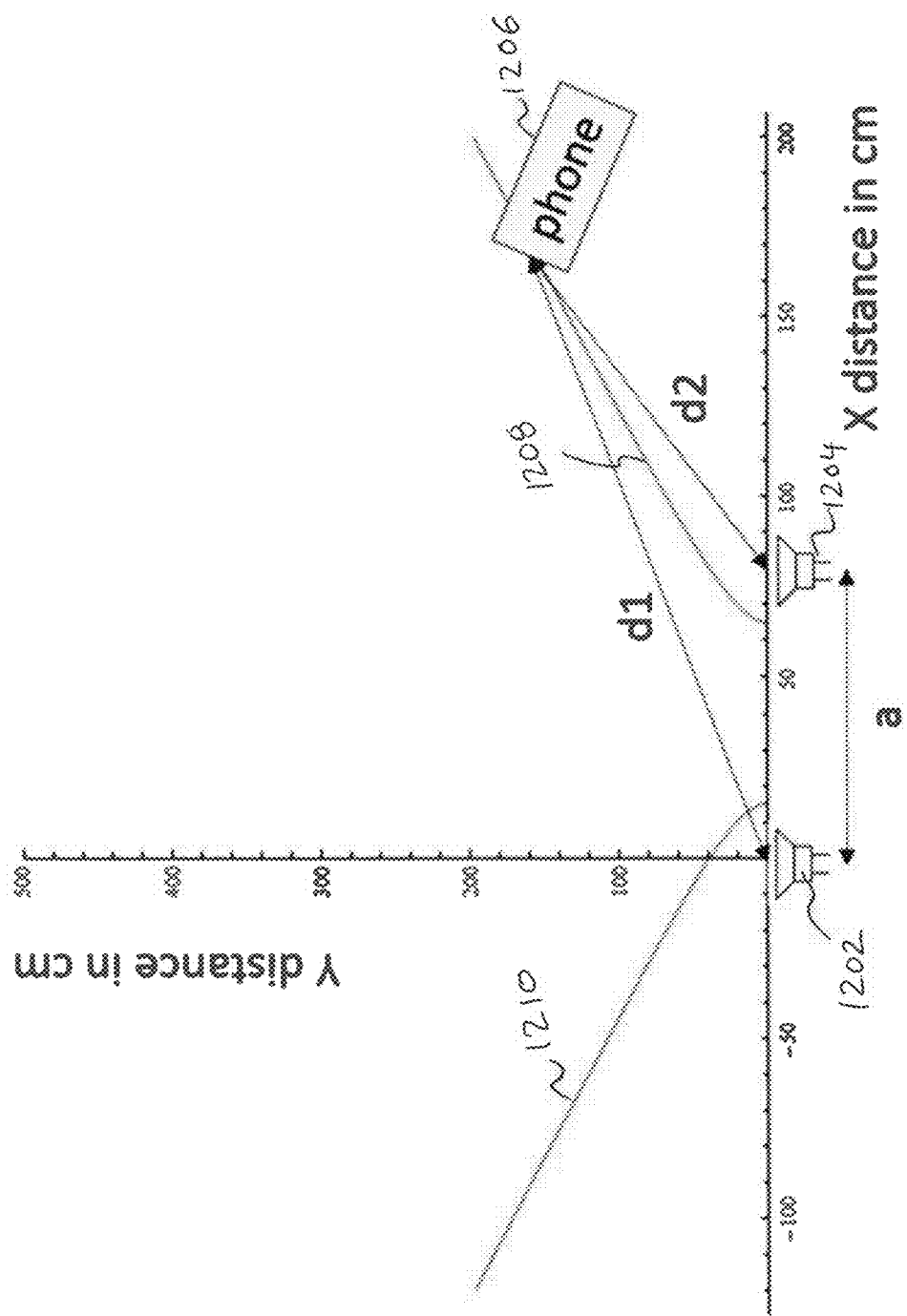
FIG. 12 is an example for validating a pairing between two devices each having a pair of acoustic transmitters and/or receivers.

FIG. 12 is an example for validating a pairing between two devices each having a pair of acoustic transmitters and/or receivers. A first device (e.g. a TV) includes a first speaker 1202 and a second speaker 1204. A second device 1206 (e.g. phone) is also shown and in various example embodiments has two or more transmitters and/or receivers.

If each TV speaker 1202, 1204 emits a different signal pattern (e.g. identifier), then by analyzing the signals arriving at two microphones (not shown) of the second device 1206 (e.g. phone), more information can be extracted, such as: a direction of the phone 1206 towards the TV, and a direction of the TV towards to phone 1206 (in other words, an angular position of the phone with respect to the TV and angular position of the TV with respect to the phone).

Also with such directional and angular information mutual direction of two devices (e.g. the TV and phone, two phones, etc.) can be determined, even by just one of the devices by analyzing beacon signals emitted from another device. In this way each device can know if both device are pointing to each other.

FIG. 12 shows calculated positions of the phone 1206 with respect to the TV. The first device (e.g. TV) speakers 1202, 1204 are at a distance "a" (e.g. 80 cm) from each other.

In this example, a front microphone of the phone detects a 50 cm difference between first acoustic path d1 and second acoustic path d2 (i.e. d1−d2=50 cm). If both speakers emit 1202, 1204 a same signal pattern, then the phone 1206 could be located either along a first curve 1208 or a second curve 1210. However, if the speakers 1202, 1204 emit different signals, this ambiguity is removed and the phone 1206 must be located along the first curve 1208 thereby giving the angular position of the TV with respect to the phone.

The phone 1206 can also be used to select a simple menu on the TV screen. For example the TV displays a horizontal menu bar, by pointing the phone 1206 toward the TV at different angles, an item of the menu can be highlighted and selected. Additional use cases are possible.

Next to directional and angular information, Doppler shift information measuring the relative speed (e.g. motion) between the devices and can be used to enable or trigger additional control features. For example: once determined that the phone 1206 is pointing at the TV and by slowly moving the phone 1206 towards the TV, volume can be increased. Or, by slowly moving the phone 1206 away from the TV, volume can be decreased. Also, if the phone 1206 is quickly moved back and forth two times, for example, the TV can be switched on or off.

A number of examples have been described where a phone can identify its angle position and/or speed with respect to an appliance, like a TV. With this information, a user (of the phone) can switch on/off the TV, or control a menu on the TV. However this is only one-way of information, because the TV has a speaker that sends out information to the phone, however, in order to control the TV, the phone needs to send back some information to the TV.

Once the phone computes its angular position toward the second device or its moving speed with respect to the second device (the second device being an appliance e.g. a TV), the phone will in various examples send a control signal to the second device to switch on/off power or control the menu of the second device.

Examples of how the control signal can be sent include the following communication channels: Ultrasound (if the second device also has a microphone, or its speaker can be used as a microphone); WIFI; Bluetooth (this could be paired in the beginning when the phone points to the second device for the first time; and Infrared.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A first acoustic pairing device, comprising:
an acoustic processor configured to receive both a first acoustic signal and a second acoustic signal from a second device;
a signal comparison module configured to identify a propagation delay or amplitude difference between the first and second acoustic signals received from the second device; and
a pairing module configured to output a pairing signal when the propagation delay or amplitude difference is between a first value and a second value;
wherein the propagation delay is translated into a direction-of-arrival from an acoustic transmitter; and
wherein pairing between an acoustic receiver and the acoustic transmitter is limited to when the direction-of-arrival is within an angular range.

2. The device of claim 1:
wherein the acoustic processor is configured to receive the first and second acoustic signals from a single acoustic receiver.

3. The device of claim 2:
wherein the first and second acoustic signals are received from a pair of in-line acoustic transmitters; and wherein the pairing signal is generated when the propagation delay or the amplitude difference between the first and second acoustic signals is greater than a preselected delay or amplitude value.

4. The device of claim 2:
wherein the first and second acoustic signals are received from a pair of side-by-side acoustic transmitters; and wherein the pairing signal is generated when the propagation delay or the amplitude difference between the first and second acoustic signals is less than a preselected delay or amplitude value.

5. The device of claim 2:
wherein the first and second acoustic signals are received from a pair of variably-arranged acoustic transmitters; and wherein the pairing signal is generated when the propagation delay or the amplitude difference between the first and second acoustic signals is either between a first delay value and a second delay value, or a first amplitude value and a second amplitude value.

6. The device of claim 1:
wherein the acoustic processor is configured to receive the first and second acoustic signals, respectively, from first and second acoustic receivers.

7. The device of claim 6:
wherein the first and second acoustic receivers are in-line; and wherein the pairing signal is generated when the propagation delay or the amplitude difference between the first and second acoustic signals is greater than a preselected delay or amplitude value.

8. The device of claim 6:
wherein the first and second acoustic receivers are side-by-side; and wherein the pairing signal is generated when the propagation delay or the amplitude difference between the first and second acoustic signals is less than a preselected delay or amplitude value.

9. The device of claim 6:
wherein the first and second acoustic receivers are variably-arranged; and wherein the pairing signal is generated when the propagation delay or the amplitude difference between the first and second acoustic signals is either between a first delay value and a second delay value, or a first amplitude value and a second amplitude value.

10. The device of claim 1:
wherein the pairing module configured to output a pairing signal when the propagation delay or the amplitude difference is greater than a first value.

11. The device of claim 1:
wherein the pairing module configured to output a pairing signal when the propagation delay or the amplitude difference is less than a second value.

12. The device of claim 1:
wherein the first and second acoustic signals are ultrasonic signals.

13. The device of claim 1:
wherein at least one of the first and second acoustic signals include at least one of: an identifier, additional data, OOB communication, authentication data, or an encryption key.

14. The device of claim 1:
wherein the acoustic signal input is configured to receive the first and second acoustic signals from at least one of: a microphone, a speaker, or a pressure sensor.

15. The device of claim 1:

wherein the a signal comparison module is configured to identify a distance between the acoustic pairing device and another acoustic device based on the amplitude difference between the first and second acoustic signals.

16. The device of claim 1:
wherein in response to the pairing signal, the acoustic pairing device at least one of: pairs with a second device; wakes-up a second device; ignores a second device; or sorts a list of devices wherein a second device is ranked first on the list.

17. The device of claim 1:
wherein the acoustic receiver is substantially omni-directional at a preselected ultrasound operating frequency.

18. The device of claim 1:
wherein the pairing signal is at least one of: an ultrasonic signal, an electromagnetic signal, or an optical signal.

19. The device of claim 1:
wherein the first acoustic signal includes a first signal identifier and the second acoustic signal includes a second signal identifier; and
wherein the signal comparison module is configured to identify a direction of the acoustic pairing device based on a difference between the first and second signal identifiers.

20. The device of claim 1:
wherein the acoustic processor configured to receive a third and fourth acoustic signal; and
wherein the signal comparison module is configured to identify a direction of two acoustic pairing devices based on a comparison between the first, second, third, and fourth acoustic signals.

21. The device of claim 1:
further comprising a control module configured, in response to the pairing signal, to select or manipulate a menu item.

22. The device of claim 21:
wherein the control module is configured to enable or trigger additional control features based on a Doppler shift between the acoustic pairing device and a second acoustic pairing device.

23. A method for acoustic pairing between a first device and a second device, executed by a computer programmed with non-transient executable instructions, comprising:
receiving, at the first device, a propagation delay or amplitude difference between a first acoustic signal and a second acoustic signal;
wherein the first and second acoustic signals are received from the second device;
pairing the first and second devices when the propagation delay or amplitude difference is between a first value and a second value;
translating the propagation delay into a direction-of-arrival from the first device to the second device; and
pairing the first and second devices when the direction-of-arrival is within an angular range.

24. The method of claim 23, further comprising:
receiving a second propagation delay or amplitude difference between a third acoustic signal and a fourth acoustic signal; and
pairing the first and second devices when the second propagation delay or amplitude difference is between a third value and a fourth value.

25. A first acoustic pairing device, comprising:
an acoustic processor configured to receive both a first acoustic signal and a second acoustic signal from a second device;
a signal comparison module configured to identify a propagation delay or amplitude difference between the first and second acoustic signals received from the second device; and
a pairing module configured to output a pairing signal when the propagation delay or amplitude difference is between a first value and a second value;
wherein the a signal comparison module is configured to identify a distance between the acoustic pairing device and another acoustic device based on the amplitude difference between the first and second acoustic signals.

26. A first acoustic pairing device, comprising:
an acoustic processor configured to receive both a first acoustic signal and a second acoustic signal from a second device;
a signal comparison module configured to identify a propagation delay or amplitude difference between the first and second acoustic signals received from the second device; and
a pairing module configured to output a pairing signal when the propagation delay or amplitude difference is between a first value and a second value;
wherein the first acoustic signal includes a first signal identifier and the second acoustic signal includes a second signal identifier; and
wherein the signal comparison module is configured to identify a direction of the acoustic pairing device based on a difference between the first and second signal identifiers.

* * * * *